(12) United States Patent
Gebhart et al.

(10) Patent No.: US 8,069,362 B2
(45) Date of Patent: Nov. 29, 2011

(54) AUTOMATED ELECTRICAL POWER SAVINGS IN VIRTUALIZATION ENVIRONMENTS

(75) Inventors: Alexander Gebhart, Akazienweg (DE); Erol Bozak, Vinzentiusstrasse (DE)

(73) Assignee: SAP AG, Walldorf (DE)

( * ) Notice: Subject to any disclaimer, the term of this patent is extended or adjusted under 35 U.S.C. 154(b) by 921 days.

(21) Appl. No.: 12/037,867

(22) Filed: Feb. 26, 2008

(65) Prior Publication Data

US 2009/0217072 A1 Aug. 27, 2009

(51) Int. Cl.
*G06F 1/00* (2006.01)
(52) U.S. Cl. ....................................... 713/330
(58) Field of Classification Search ............... 713/320; 723/330
See application file for complete search history.

(56) References Cited

U.S. PATENT DOCUMENTS

| | | | |
|---|---|---|---|
| 7,526,515 B2* | 4/2009 | Broussard et al. | 1/1 |
| 7,609,047 B2* | 10/2009 | Ravichandran | 323/351 |
| 7,694,101 B2* | 4/2010 | Lecomte et al. | 711/170 |
| 7,831,820 B2* | 11/2010 | Winner et al. | 713/1 |
| 7,861,102 B1* | 12/2010 | Ranganathan et al. | 713/300 |

* cited by examiner

*Primary Examiner* — Mohammed Rehman
(74) *Attorney, Agent, or Firm* — Mintz, Levin, Cohn, Ferris, Glovsky and Popeo, P.C.

(57) ABSTRACT

Methods and apparatus, including computer program products, are provided for shutting down a host, such as a computer, server, and the like, to enable power savings. In one aspect, there is provided a computer-implemented method. The computer-implemented method includes determining whether to shutdown an application at a virtual machine. The determination is made using information from the application. The virtual machine and application operate on a host. A power management mechanism of the host may be initiated to enable a power savings when compared to not shutting down the host. Related apparatus, systems, methods, and articles are also described.

21 Claims, 3 Drawing Sheets ated Electrical Power

AUTOMATED ELECTRICAL POWER SAVINGS IN VIRTUALIZATION ENVIRONMENTS

FIELD

The present disclosure generally relates to virtual machines and, in particular, saving electrical power in environments implementing virtual machines.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications including games.

Some attribute the popularity of the computers to the Internet. The Internet provides people with a ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Virtualization is a technology for optimizing processing at a computer. Virtualization provides a software layer that when executed allows one or more virtual machines with, in some cases, different operating systems to run side-by-side with other virtual machines running on the same host (e.g., a physical machine, such as a node, a computer, a processor, a server, a blade, and the like). A virtual machine is a machine that is defined and implemented in software rather than hardware. The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines as application servers. In both cases, fifty application servers are deployed, but with virtualization, the number of physical servers is reduced to twenty-five. Virtualization software may also control one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

An example of virtualization software is a hypervisor (also referred to as a virtual machine controller or, more simply, a controller). VMWare ESX and VMware Server are examples of hypervisor software for virtualizing an operating environment (including operating system, IP (Internet Protocol) addresses, registries, and other aspects normally found in a computer system) to provide a virtual machine. The hypervisor software may control (or manage) the physical machine's processor, memory, storage, network bandwidth, and other resources enabling the virtual operating environments (i.e., systems).

SUMMARY

The subject matter disclosed herein provides methods and apparatus, including computer program products, for shutting down one or more hosts to enable power savings.

In one aspect, there is provided a computer-implemented method. The computer-implemented method includes determining whether to shutdown an application at a virtual machine. The determination is made using information from the application. The virtual machine and application run on a host. A power management mechanism of the host may be initiated to enable a power savings when compared to not shutting down the host.

Variations may include one or more of the following features. The host may implement the power management mechanism as at least one of a shutdown of a host or a hibernation of the host. The shutdown or the hibernation of the host enables a power savings when compared to not shutting down the host. One or more virtual machines may be consolidated by moving one or more virtual machines to at least one host. Performance information of the host may be received to determine whether to consolidate one or more virtual machines. A shutdown of one or more hosts may be initiated based on the consolidation of the one or more virtual machines. The application may provide information representative of when the application would accept a shutdown. A stop command may be sent to an application at the virtual machine to stop one or more processes. The application, the virtual machine, and the corresponding host may be shutdown, when the application does not reply to indicate that the stop command is rejected. The application may include an interface for initiating a shutdown of the application. Information from the application may be defined to include information from an operating system of the application. After the shutdown of a host, the host may initiate the start of at least the host, a virtual machine, and the application. The host may be implemented as a computer.

The subject matter described herein may be implemented to realize the advantage of providing power savings in systems including virtual machines.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
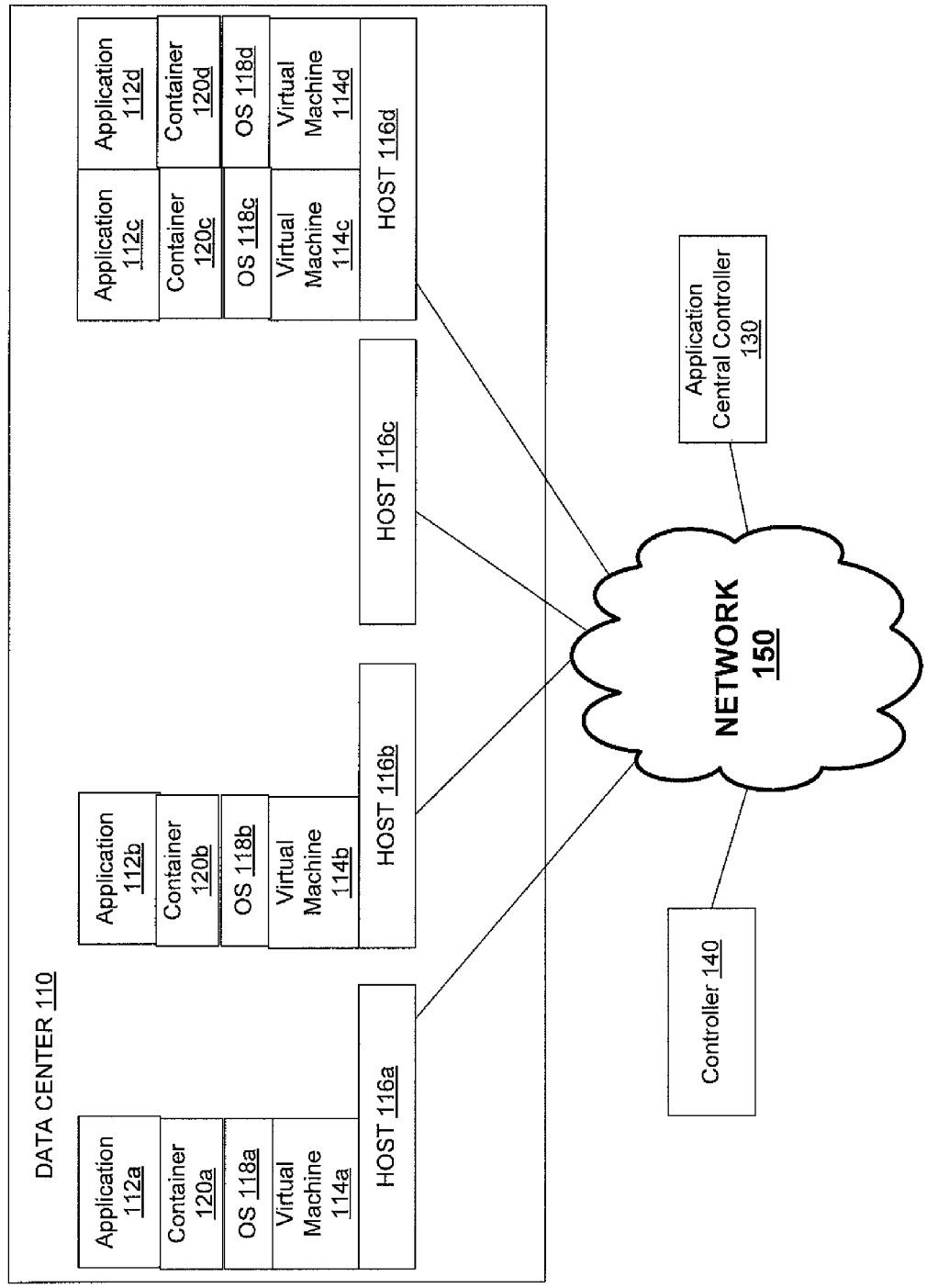
FIG. 1 depicts a block diagram of a system 100 including virtual machines.

Like labels are used to refer to same or similar items in the drawings.

DETAILED DESCRIPTION

Virtual machines may, in some implementations, provide the benefit of increasing physical resource utilization by, for example, running a plurality of virtual machines on one host, i.e., a physical machine, such as a node, a computer, a processor, a server, a blade, and the like. For example, a virtual machine running a credit card processing application using a Linux operating system may be hosted on the same physical machine as another virtual machine running an instance of a database application using a Sun operating system. In contrast, without the use of virtual machines, both the credit card application and the database application would run on different physical machines.

Moreover, as virtual machines are moved, shutdown, and the like, a corresponding host (i.e., physical machine) may be shutdown as well—resulting in power savings in connection with the host shutdown. However, the controllers of virtual machines (referred to as virtual machine controllers (VMC)) may not have sufficient knowledge regarding the applications running on a virtual machine to determine whether to shutdown the application and its corresponding host. As such, the virtual machine controller cannot shutdown the virtual machine including the application, without risking damage to a process being run by the application. To that end, the subject matter described herein provides a mechanism to save electrical power in system environments that include virtual machines.

FIG. 1 depicts a system 100 including a data center 110, hosts 116a-d, an application central controller (APP-CC) 130, and a controller 140, all of which may be coupled by a network, such as network 150 (e.g., the Internet, an intranet, and/or other communication mechanisms). Moreover, the hosts may each include a virtual machine stack comprising a virtual machine, such as virtual machines 114a-d, an operating system (OS), such as operating systems 118a-d, a container, such as containers 120a-d, and an application, such as applications 112a-d.

In some implementations, there is a single point of access (or contact) at each virtual machine stack. The single point of access provides an indication of whether a shutdown of an operating system or a virtual machine is possible based on whether the application(s) running inside of the operating system or the virtual machine can be shutdown or hibernated. In some implementations, the application central controller (APP-CC) is used as the single point of contact that supervises and accesses the operating system and/or the virtual machine, any application running inside of a container (e.g., J2EE, ABAP, .NET, or the like), and any application running outside of a container. In such implementations, the APP-CC has a so-called "complete picture" of the application level and whether a shutdown or hibernation is appropriate. To get this so-called "complete picture," the APP-CC may directly contact the operating system, the container, or the applications, while in some cases APP-CC may use agents running inside of a container to access the information required to form the complete picture, i.e., of whether a shutdown or hibernation may take place.

The APP-CC, such as APP-CC 130, may operate as a so-called "active" component that can prompt an application to prepare for a shutdown or a hibernation and receive a response from the application of whether a shutdown or hibernation can take place. In some cases, the application may respond that the application can shutdown immediately, that the application can shutdown at a later time (e.g., in 10 minutes), or that the application cannot shutdown due to open user sessions. The response from the application can be used by APP-CC 130 or any other central management system to decide based on policies if a shutdown or hibernation should be initiated.

Hosts 116a-d represents physical machines (e.g., processors, computers, servers, blades, and the like) capable of hosting one or more virtual machines.

The virtual machines 125a-d are implemented on hosts 116a-d. The phrase "virtual machine" refers to software for creating a virtualized environment between the host and the host's operating system (e.g., hypervisors). In some implementations, the virtual machine may be implemented as a so-called "virtual appliance," which refers to a virtual machine that includes an operating system and one or more applications and/or data. Moreover, the virtual machines 114a-d may each run an application (e.g., a software program, an application program, a component of an application program, an applet, or the like). In some implementations, each of the applications 112a-112d may have an operating system, such as operating systems 118a-d, such as Microsoft Windows, Microsoft Vista, Java, Sun OS, Linux, and the like. The application 112a may also be included in a J2EE container, such as containers 120a-d, or any other container, such as a .NET container or an ABAP container. In some cases, the container may be omitted when the application runs directly on the operating system.

Application central controller (APP-CC) 130 is a central controller and, in some implementations, a single point of contact for any management system that manages information regarding whether any application running on an operating system or a virtual machine may be shutdown or, alternatively, may be put into hibernation without damaging the application or its processes. Although APP-CC 130 is depicted in FIG. 1 as separate from the applications 112a-d, in some implementations, APP-CC 130 may be included within applications 112a-d or within a container (ABAB, J2EE) or their corresponding operating systems.

After virtual machine 114a and application 112a start (e.g., boot) and run, application 112a may determine if APP-CC 130 is accessible. If so, application 112a may send a command, such as a message, to APP-CC 130 to force a shutdown or a hibernation. Alternatively, the command may ask whether the shutdown or hibernation may proceed. The command may indicate that a hibernation or a shutdown of the application 112a (and its operating system) is to be initiated at the present time. If, however, a connection to application 112a (e.g., from a client application, a browser, or other program) is subsequently established, application 112a may no longer be in a state in which a hibernation or a shutdown should be allowed. When this is the case, application 112a may be forced to open and hold sessions for the connection and to notify APP-CC 130 that neither a shutdown nor a hibernation may be initiated at application 112a, operating system 118a, container 120a, virtual machine 114a, or host 116a. When the connection to application 112a ceases (e.g., the session terminates or the client application disconnects), application 112a may then notify APP-CC 130 that a shutdown or a hibernation may be initiated at application 112a, virtual machine 114a, or host 116a.

As used herein, the term "hibernation" refers to a mode of the computer (e.g., host 116a) that saves a program's state (e.g., the state of application 112a) including program data before shutting down the program and shutting down the host. Hibernation enables a restart of the host to recover from hibernation more quickly by reading the saved program sate. In some implementations, the hibernation is implemented to partially shutdown (or place on standby) only certain aspects of the computer (e.g., a hard drive, a network access card, and the like). This partial shutdown is also considered a hibernation, as that term is used herein. Hibernation is considered a power saving technique since no (or very little power is used during the hibernation. As used herein, the "hibernation" state includes low power modes, such as standby. On the other hand, a shutdown refers to completely shutting down a host computer including any running applications, so that during a restart the computer and application have to be restarted. A shutdown is also a form of power management. As used herein the phrase "power management mechanism" refers to a standby, a hibernation, and/or any other mode into which a host (e.g., a computer including programs) may be placed to enable saving electrical power.

In some implementations, APP-CC 130 may be implemented as a web service. For example, the operating system associated with application 112a may, at start up, search for and access a web service providing an instance of APP-CC 130. Likewise, the operating system associated with application 112b may, at start up, search for and access another instance of the web service APP-CC 130. A service, such as a web service, is an application that may make itself available over the Internet or an intranet, may use standardized messaging, such as XML (eXtensible Markup Language) and Simple Object Access Protocol (SOAP), and may use some type of location mechanism, such as UDDI (Universal Description, Discovery, and Integration), to locate the service and its public Application Program Interface (API).

In other implementations, the operating system of the applications may each include an APP-CC 130. In some cases, APP-CC 130 may be included in a container running on the operating system. Alternatively, APP-CC can also be running in a central location, i.e., outside of a specific operating system or virtual machine. When the APP-CC 130 runs in a so-called "outside" configuration security mechanisms are typically disabled to enable full access to all resources of an operating system via a remote connection.

The controller 140 may control one or more virtual machines 114a-d. For example, controller 140 may be implemented as a virtual machine manager (e.g. VMware Virtual Center), or any other mechanism capable of controlling aspects of one or more virtual machines. Controller 140 may perform one or more of the following: control and interact with each of the virtual machines 114a-d; receive information from the APP-CC 130; initiate movement of a virtual machine from one host to another host; suspend a virtual machine; shutdown a virtual machine; restart a virtual machine; shutdown a host; restart a host (e.g., using a wake-on-LAN command); and increase or decrease aspects of a virtual machine (e.g., vary processing power, vary memory or storage, or vary network bandwidth). In some implementations, controller 140 includes APP-CC 130.

Figure 2:
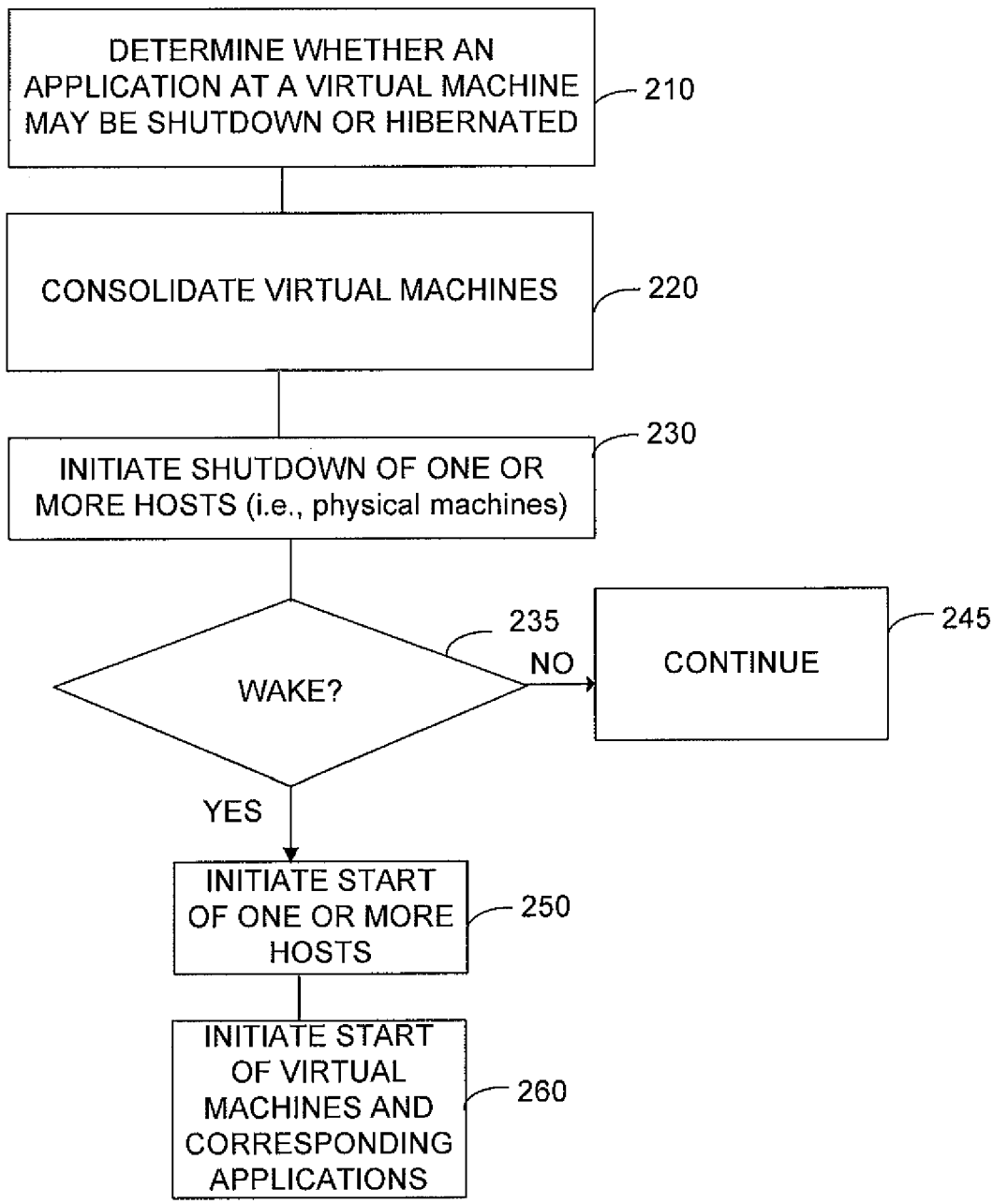
FIG. 2 depicts a process 200 for shutting down a host, such as a server, of a virtual machine to enable a power savings.

FIG. 2 depicts a process 200 for saving electrical power in a system 100 implementing virtualization technology, such as virtual machines 114a-d.

At 210, APP-CC 130 may determine whether an application at a virtual machine may be shutdown or hibernated. For example, APP-CC 130 may receive an indication from application 112a or its corresponding operating system regarding whether a shutdown or a hibernation of application 112a may be initiated. In some cases, the indication may be implemented as one or more messages expressly stating that a shutdown or a hibernation may be initiated. In other cases, the indication may provide information, such as the number of active processes (or connections) being handled by application 112a, to enable APP-CC 130 to determine whether a shutdown or a hibernation may be initiated at application 112a.

In some implementations, APP-CC 130 is a single point of contact for controller 140. When this is the case, APP-CC 130 is capable of indicating to controller 140 whether a shutdown of the operating system or virtual machine is possible based on whether the application(s) running inside of the operating system or virtual machine can be shutdown or hibernated. In some implementations, APP-CC 130 supervises the operating systems, processes with the operating systems, the virtual machines, any applications running outside of the containers, and/or any applications running inside of a container. In such implementations, the APP-CC 130 has the so-called "complete picture" of the application level and whether a shutdown or hibernation is appropriate. Moreover, the APP-CC 130 may directly contact the operating system, the container, or the applications (or their corresponding management systems), while in other cases APP-CC 130 may use agents running inside of a container, operating system, or application to access the information required to form the complete picture, i.e., of whether a shutdown or hibernation may take place. APP-CC 130 may actively prompt an application, operating system, container, and the like to prepare for a shutdown or a hibernation and then receive a response from the application, operating system, container, and the like of whether a shutdown or hibernation can take place. For example, the application may respond that the application can shutdown immediately, that the application can shutdown at a later time (e.g., in 10 minutes), or that the application cannot shutdown due to open user sessions. The response from the application can be used by APP-CC 130 or any other central management system to decide based on policies (e.g., determined by a user) if a shutdown or hibernation should be initiated.

To illustrate by way of an example, application 112a (and/or its the operating system) is typically considered when determining whether to hibernate or to suspend the application 112a; otherwise, so-called "damage" to application 112a may occur. Application 112a may include a session (e.g., a user connection, a process, and the like). However, that session may, at any given point in time, have zero central processing unit (CPU) utilization, such as when a user is not performing a specific task at application 112a. In this example, unless information from application 112a or its operating system is considered, simply looking at CPU utilization and initiating a shutdown of application 112a may damage application 112a (e.g., losing the connection to the user) since CPU utilization is not, in this instance, an appropriate indication of whether a shutdown is appropriate. In another scenario, even though a user (e.g., user's browser or a client application) is connected to application 112a, application 112a may be performing a background task, such as indexing. In this second example, although CPU utilization and disk utilization are high, application 112a may be shutdown or hibernated since these tasks could readily be performed at another time and the task could be stopped by the application itself. This is another example in which consideration of information from the application is mandatory and operating system information is not sufficient to answer the question of weather an application can or cannot be shutdown.

In some other implementations, APP-CC 130 sends a "stop" command (e.g., a message requesting that a process terminate) at the process level to the operating system of application 112a. If no process at application 112a or its operating system declines the stop command, application 112a may be a candidate for a hibernation or a shutdown. Alternatively, APP-CC 130 may send a command that asks whether or when a shutdown or hibernation may take place.

In some implementations, controller 140 may connect to APP-CC 130 to determine whether one or more of the virtual machines 114a-d may be shutdown or hibernated. For example, controller 140 may connect to an APP-CC 130 for application 112a, connect to another APP-CC for application 112b, and so forth, to determine whether to shutdown or hibernate the OS or the virtual machine containing the running application.

Figure 3:
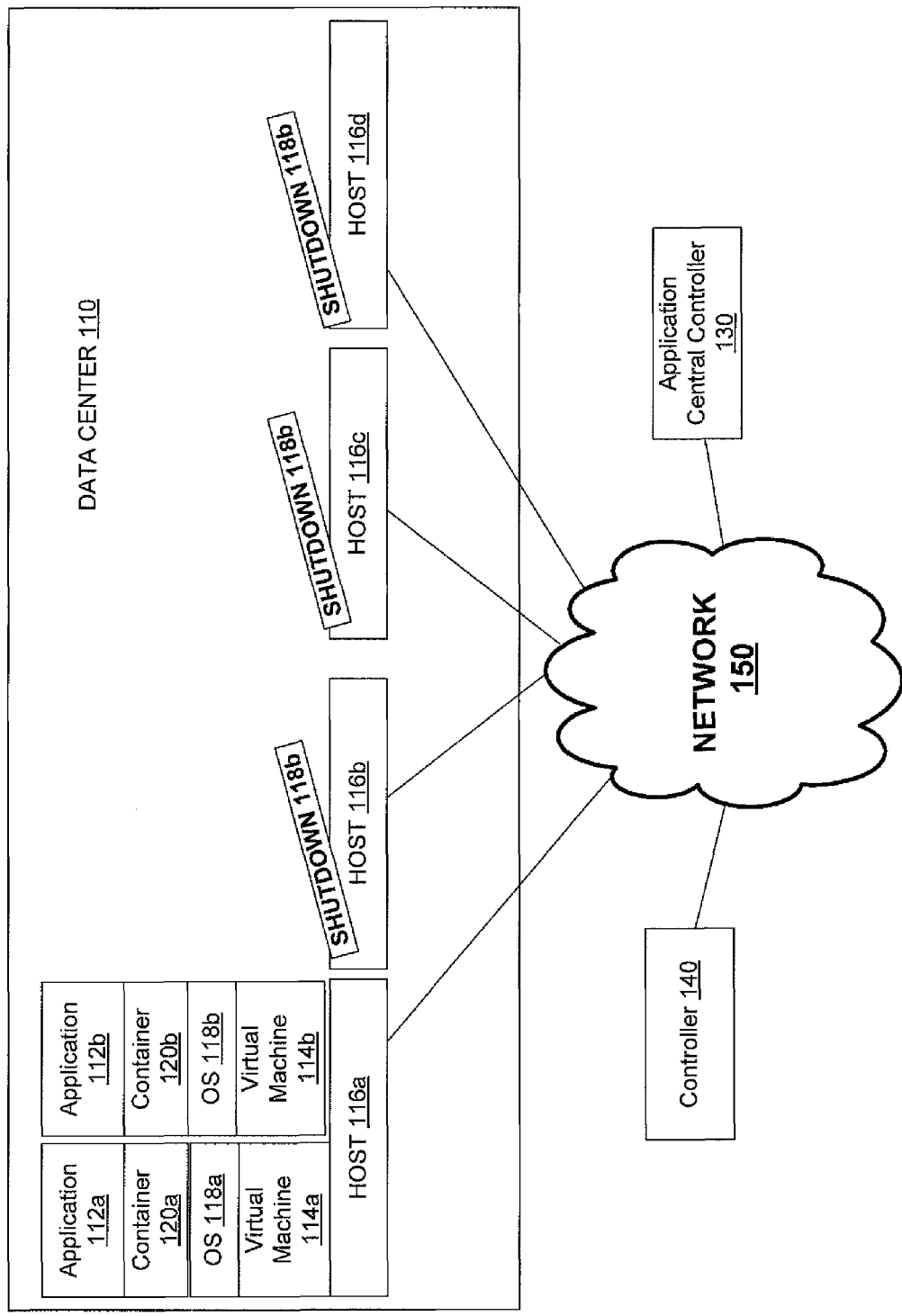
FIG. 3 a block diagram of the system 100 after a shutdown of one or more hosts.

At 220, controller 140 determines whether to consolidate (e.g., move, shutdown, hibernate, or the like) one or more virtual machines. By consolidating virtual machines, physical hosts may be eligible to be shutdown or hibernated. For example, APP-CC 130 may include information indicating that application 112a and application 112b have processes that cannot be shutdown, but that application 112c and 112d may be shutdown. In this example, controller 140 may move application 112b and virtual machine 114b to host 116a. FIG. 3 depicts system 100 after that move. The more applications, such as applications 112c and d, that are shutdown (e.g., shutting down virtual machines 114c and d and their stacks), the more physical hosts that can be made available for shutdown.

In some implementations, controller 140 may include information representative of the processing capabilities, memory capacity, storage capacities, and network bandwidth at each of hosts 116a-d as well as the requirements (e.g., processing, memory, storage, and network bandwidth) of each of the applications 112a-d. When this is the case, controller 114 determines whether moving an application and virtual machine to another host may be made based on the capabilities of the host and the requirements of the application and the virtual machine being hosted. For example, controller 140 may move application 112b and virtual machine 114b to host 116a only when sufficient resources (e.g., processing capabilities, memory capabilities, storage capacities, and network bandwidth) are available at host 116a.

At 230, controller 140 may initiate a shutdown or a hibernation of one or more physical hosts. Returning to the above example, after application 112b and virtual machine 112b are consolidated to host 116a and given that application 112c and application 112d may be shutdown, controller 140 may send a command to shutdown physical host 116b, 116c, and 116d. FIG. 3 depicts system 100 after controller 140 has initiated those shutdowns 118b, c, d. As a result of the process 200, one or more physical host machines are shutdown to save electrical power. Although FIG. 3 depicts shutdowns, other power management mechanisms may be used as well.

At 235, controller 140 may continue 245 operation with shutdowns 118b-d until controller 140 determine that one or more hosts should be restarted (e.g., a reboot or a wake procedure). For example, controller 140 may monitor virtual machines 114a-b and determine that the additional physical resources (e.g., processing, memory, storage, and/or network bandwidth) may be required. When that is the case, controller 140 may restart one or more hosts.

At 250, controller 140 may restart one or more hosts. For example, controller 140 may send a "wake-on-LAN" command to restart a host, although other mechanisms may be used to restart hosts. Returning to FIG. 3 where hosts 116b-d were shutdown 1118b-d, controller 140 may send a wake-on-LAN command to start one or more hosts 116b-d.

At 260, controller 140 may also restart applications and virtual machines to run on one or more restarted hosts. For example, controller 140 may restart applications 112c-d and virtual machines 114c-d, which were previously shutdown in the example described above in connection with FIG. 3. In some cases, the startup of an application may be performed by using a so-called master component that initiates the start of so-called sub-components. An example of this case would be the use of a central instance of a cluster, where the central instance is not shutdown. The central instance is an application server that controls the computational processes among a cluster of computers. This central instance can initiate the start of many application servers (e.g., dialog instances). Alternatively, when there is not a so-called master component, a central starter component may be used to restart an application. The central starter component may receive information (from the application being restarted) regarding under which circumstances the startup of an application may take place.

In some implementations, one or more of the applications 112a-d may provide an indication to APP-CC 130 regarding a shutdown or a hibernation. In some implementations, one or more of the applications 112a-d may provide information representative of the circumstances (e.g., conditions and triggers) under which it is able to accept a hibernation or a shutdown. For example, application 112b may notify APP-CC 130 that application 112b may be shutdown if two connections are closed and that application 112b is able to do a graceful disconnect. After receipt of such an indication, the process 200 of FIG. 2 may be used to determine whether to shutdown a host forcefully, so that the application does, for example, a so-called "ungraceful" disconnect.

In some implementations, applications 114a-d may include a programming interface from which a shutdown or a hibernation may be initiated. For example, the interface may be a standardized interface that applications 112a-d each provides to allow a forced switch into a mode in which it is possible to do a shutdown or a hibernation.

Although FIG. 1 depicts hosts 116a-d in data center 110, hosts 116a-d may be located anywhere as well. Moreover, in some implementations, APP-CC 130 and controller 140 may be incorporated into a single mechanism.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A non-transitory computer-readable storage medium containing instructions to configure a processor to perform a method, the method comprising:
   determining whether to shutdown or hibernate an application through at least one of an operating system and a virtual machine, the determination made using information from the application, the virtual machine, and the operating system on a host; and
   initiating, based on the results of the determination, a power management mechanism of the host,
   wherein the determination results in the hibernation of the application, when the power management mechanism of the host initiates the hibernation of the application, and
   wherein the determination results in the shutdown of the application, when the power management mechanism of the host initiates the shutdown of the application.

2. The computer-readable medium of claim 1 further comprising:
   implementing the power management mechanism as at least one of a shutting down of the host or a hibernating of the host, such that the power management mechanism of the host enables a power savings, when compared to not shutting down the host,
   wherein the determination results in the hibernation of the host, when the power management mechanism of the host initiates the hibernation of the host,
   wherein the determination results in the shutdown of the host, when the power management mechanism of the host initiates the shutdown of the host.

3. The computer-readable medium of claim 1 further comprising:
   consolidating one or more virtual machines by moving the one or more virtual machines to at least one of a plurality hosts.

4. The computer-readable medium of claim 3 further comprising:
   receiving performance information of the at least one host to determine whether to consolidate the one or more virtual machines; and
   consolidating the one or more virtual machines by moving the one or more virtual machines based on the received performance information.

5. The computer-readable medium of claim 4 further comprising:
   initiating a shutdown of at least one of a plurality of hosts based on the consolidation of the one or more virtual machines.

6. The computer-readable medium of claim 1 further comprising:
   providing, by the application, information representative of when the application would accept a shutdown.

7. The computer-readable medium of claim 1 further comprising:
   sending a stop command to an application at the virtual machine to stop one or more processes; and
   shutting down the application, a container, the virtual machine, the operating system, and the corresponding host, when the application does not reply to indicate that the stop command is rejected.

8. The computer-readable medium of claim 1 further comprising:
   including, at the application, an interface for initiating a shutdown of the application.

9. The computer-readable medium of claim 1 further comprising:
   defining information from the application to include information from the operating system of the application.

10. The computer-readable medium of claim 1 further comprising:
    initiating a start of at least one host with a wake-on local area network command, after a shutdown of the at least one host.

11. The computer-readable medium of claim 10 further comprising:
    initiating, at a started host, a start of at least one virtual machine and at least one application.

12. The computer-readable medium of claim 1 further comprising:
    implementing the host as a computer.

13. The computer-readable medium of claim 1 further comprising:
    receiving information from at least one of the application or the operating system, the received information enabling a determination of whether the application may be shutdown.

14. The computer-readable medium of claim 13 further comprising:
    receiving the information at a web service.

15. The computer-readable medium of claim 1 further comprising:
    implementing the virtual machine as a virtual appliance including the operating system and data.

16. The computer-readable medium of claim 1, wherein the determining whether to shutdown or hibernate the application is further determined using an application central controller performing operations comprising:
    prompting the application to prepare for the shutdown or hibernation;
    receiving a response from the application; and
    deciding based on at least one of a plurality of policies whether to initiate the shutdown or the hibernation.

17. A computer-implemented method comprising:
    determining whether to shutdown or hibernate an application through at least one of an operating system and at a virtual machine, the determination made using information from the application, the virtual machine, and the operating system on a host; and
    initiating, based on the results of the determination, a power management mechanism of the host,
    wherein the determination results in the hibernation of the application, when the power management mechanism of the host initiates the hibernation of the application, and
    wherein the determination results in the shutdown of the application, when the power management mechanism of the host initiates the shutdown of the application.

18. The computer-implemented method of claim 17 further comprising:
    implementing the power management mechanism as at least one of a shutting down of the host or a hibernating of the host, such that the power management mechanism of the host enables a power savings, when compared to not shutting down the host, wherein the determination results in the hibernation of the host, when the power management mechanism of the host initiates the hibernation of the host, wherein the determination results in the shutdown of a host, when the power management mechanism of the host initiates the shutdown of the host.

19. The computer-implemented method of claim 17 further comprising:

consolidating one or more virtual machines by moving the one or more virtual machines to at least one of a plurality of hosts.

20. The computer-implemented method of claim 19 further comprising:

receiving performance information of the at least one host to determine whether to consolidate the one or more virtual machines; and consolidating the one or more virtual machines by moving the one or more virtual machines based on the received performance information.

21. A system comprising:

a processor; and a memory, wherein the processor and the memory are configured to perform a method comprising:

determining whether to shutdown or hibernate an application at a virtual machine, the determination made using information from the application, the virtual machine and the operating system on a host; and initiating, based on the results of the determination, a power management mechanism of the host, wherein the determination results in the hibernation of the application, when the power management mechanism of the host initiates the hibernation of the application, and wherein the determination results in the shutdown of the application, when the power management mechanism of the host initiates the shutdown of the application.

\* \* \* \* \*